(12) United States Patent
Okajima et al.

(10) Patent No.: US 11,669,691 B2
(45) Date of Patent: Jun. 6, 2023

(54) INFORMATION PROCESSING APPARATUS, INFORMATION PROCESSING METHOD, AND COMPUTER READABLE RECORDING MEDIUM

(71) Applicant: NEC CORPORATION, Tokyo (JP)

(72) Inventors: Yuzuru Okajima, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 738 days.

(21) Appl. No.: 16/498,801

(22) PCT Filed: Feb. 26, 2018

(86) PCT No.: PCT/JP2018/007040
§ 371 (c)(1),
(2) Date: Sep. 27, 2019

(87) PCT Pub. No.: WO2018/180106
PCT Pub. Date: Oct. 4, 2018

(65) Prior Publication Data
US 2021/0191986 A1    Jun. 24, 2021

(30) Foreign Application Priority Data
Mar. 30, 2017 (JP) .............................. JP2017-068453

(51) Int. Cl.
*G06F 17/00* (2019.01)
*G06F 40/35* (2020.01)
(Continued)

(52) U.S. Cl.
CPC .............. *G06F 40/35* (2020.01); *G06F 16/00* (2019.01); *G06F 16/90332* (2019.01);
(Continued)

(58) Field of Classification Search
CPC .......... G06F 16/00; G06F 40/00; G06F 40/10; G06F 40/20; G06F 40/30; G06F 16/20;
(Continued)

(56) References Cited

U.S. PATENT DOCUMENTS

| 10,769,209 B1* | 9/2020 | Saliba | G06F 16/86 |
| 2017/0161027 A1* | 6/2017 | Singh | G06N 5/047 |

(Continued)

FOREIGN PATENT DOCUMENTS

| JP | 05-46370 A | 2/1993 |
| JP | 2016-095698 A | 5/2016 |

(Continued)

OTHER PUBLICATIONS

Jauhar, Sujay Kumar, Peter Turney, and Eduard Hovy. "Tables as semi-structured knowledge for question answering." Proceedings of the 54th Annual Meeting of the Association for Computational Linguistics (vol. 1: Long Papers). 2016. (Year: 2016).*

(Continued)

*Primary Examiner* — Michael Ortiz-Sanchez
(74) *Attorney, Agent, or Firm* — Sughrue Mion, PLLC

(57) ABSTRACT

An information processing apparatus (10) includes: a formal language query accepting unit (12) that accepts a query expression and correct answer data; a semi-structured data accepting unit (14) that accepts semi-structured data that includes text nodes; a node text extraction unit (16) that extracts natural language text from the text node, as node text; a node text expression generation unit (18) that receives the node text from the a converter (100) and obtains node text expressions; an answer calculation unit (20) that calculates an answer to the query expression with use of the node text expressions; and an update unit (22) that, if the answer calculated by the answer calculation unit (20) matches the correct answer data, updates parameters in the converter (Continued)

(100) such that the corresponding node text expression is more likely to be output in the converter (100).

17 Claims, 13 Drawing Sheets

(51) Int. Cl.
| | | |
|---|---|---|
| *G06F 40/20* | (2020.01) | |
| *G06F 16/00* | (2019.01) | |
| *G06F 16/9032* | (2019.01) | |
| *G06N 20/00* | (2019.01) | |
| *G06F 40/30* | (2020.01) | |
| *G06N 5/04* | (2023.01) | |
| *G06F 18/214* | (2023.01) | |

(52) U.S. Cl.
CPC ............ *G06F 18/214* (2023.01); *G06F 40/20* (2020.01); *G06F 40/30* (2020.01); *G06N 5/04* (2013.01); *G06N 20/00* (2019.01)

(58) Field of Classification Search
CPC ........ G06F 16/90; G06F 16/93; G06F 16/903; G06F 16/907; G06N 5/04; G06N 5/02; G06N 5/003; G06N 20/00; G06K 9/62; G06K 9/6201; G06K 9/6256
See application file for complete search history.

(56) References Cited

U.S. PATENT DOCUMENTS

| | | | |
|---|---|---|---|
| 2018/0276525 A1* | 9/2018 | Jiang | .................... G06F 40/216 |
| 2019/0266286 A1* | 8/2019 | Torras | .................... G06F 40/30 |

FOREIGN PATENT DOCUMENTS

| | | | |
|---|---|---|---|
| WO | 2014/158182 A2 | 10/2014 | |
| WO | WO-2016050066 A1 * | 4/2016 | ........... G06F 16/243 |

OTHER PUBLICATIONS

Percy Liang et al., "Learning dependency-based compositional semantics", Proceedings of the 49th Annual Meeting of the Association for Computational Linguistics, Jun. 19-24, 2011, pp. 590-599, Portland, Oregon.

Panupong Pasupat et al., "Compositional Semantic Parsing On Semi-Structured Tables", Proceedings of the 53rd Annual Meeting of the Association for Computational Linguistics and the 7th International Joint Conference on Natural Language Processing, Jul. 26-31, 2015, pp. 26-31, vol. 1, Beijing China.

International Search Report for PCT/JP2018/007040, dated May 22, 2018.

* cited by examiner

Fig. 3

| Name | Form | Uses | Side effects | Warnings |
|---|---|---|---|---|
| Medicine-A | Powder | Appetite stimulation | loss of emotion | Overdose causes dizziness. |
| Medicine-B | Pill | prevention of coughs | decreased appetite | --- |

Fig. 4
(a)
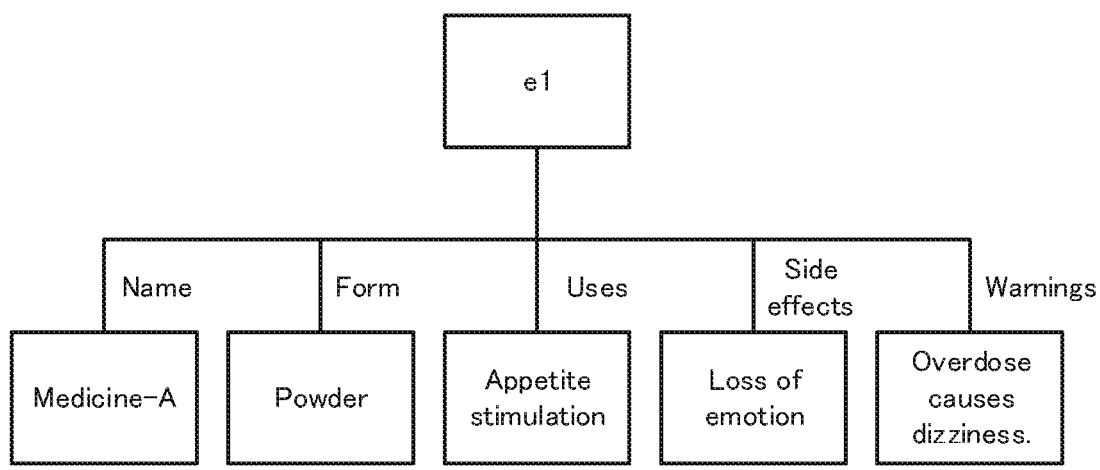
(b)
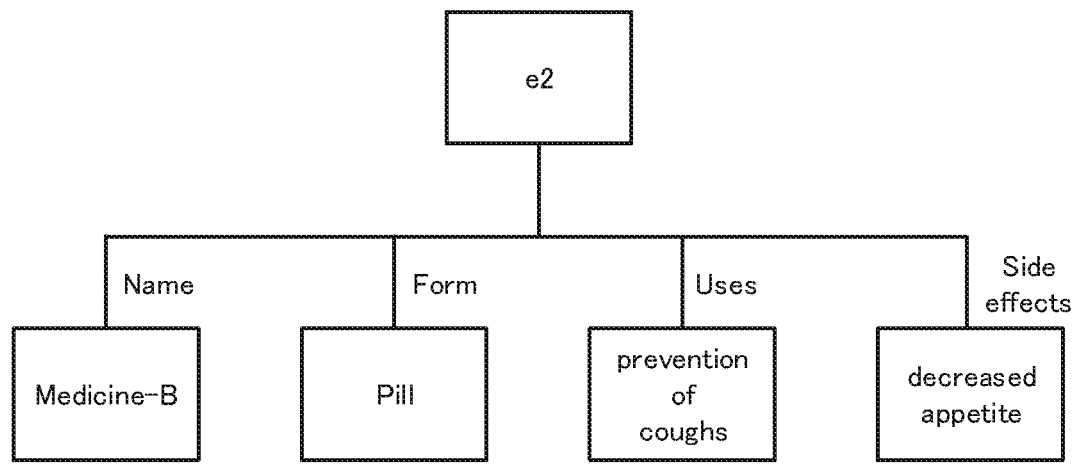

Fig. 5

| SURFACE LAYER TERM | DEEP LAYER TERM | | |
|---|---|---|---|
| loss | increase | increase/1 | increase/2 |
| | loss | loss/1 | loss/2 |
| | decrease | decrease/1 | decrease/2 |
| appetite | ... | ... | ... |
| | appetite | appetite/1 | appetite/2 |
| | ... | ... | ... |
| cause | ... | ... | ... |
| | cause | cause/1 | cause/2 |
| | ... | ... | ... |
| cough | ... | ... | ... |
| | cough | cough/1 | cough/2 |
| | ... | ... | ... |
| decrease | ... | ... | ... |
| | decrease | decrease/1 | decrease/2 |
| | ... | ... | ... |
| dizziness | ... | ... | ... |
| | dizziness | dizziness/1 | dizziness/2 |
| | ... | ... | ... |
| emotion | ... | ... | ... |
| | emotion | emotion/1 | emotion/2 |
| | ... | ... | ... |
| diminish | increase | increase/1 | increase/2 |
| | diminish | diminish/1 | diminish/2 |
| | decrease | decrease/1 | decrease/2 |
| Name | name/2 | | |
| Form | form/2 | | |
| Uses | uses/2 | | |
| Side effects | side_effects/2 | | |
| Warning | warning/2 | | |

Fig. 6
(a)
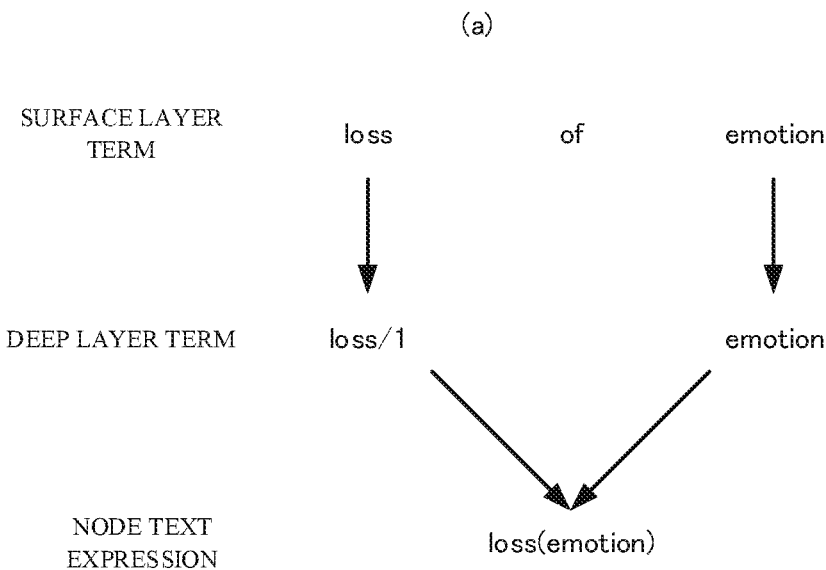
(b)
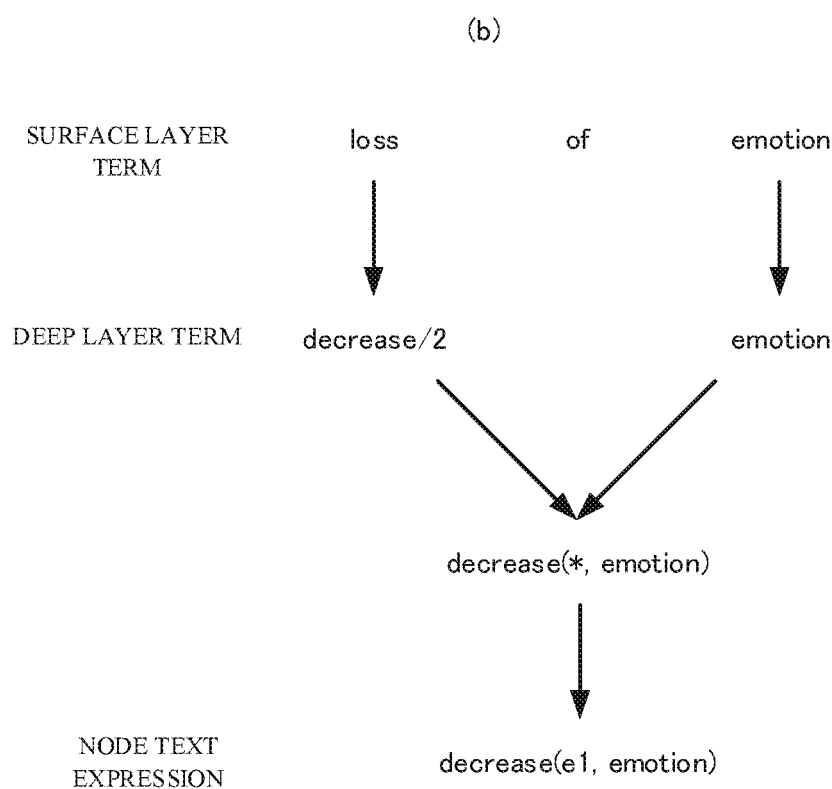

Fig. 7

| FEATURE | | WEIGHT |
|---|---|---|
| SURFACE LAYER TERM | DEEP LAYER TERM | |
| loss | increase | -100 |
| loss | increase/1 | -100 |
| loss | increase/2 | -100 |
| loss | loss | -2 |
| loss | loss/1 | -2 |
| loss | loss/2 | -2 |
| loss | decrease | -100 |
| loss | decrease/1 | -100 |
| loss | decrease/2 | -100 |
| ... | ... | ... |
| ... | ... | ... |

| EXPRESSION | PROBABILITY |
|---|---|
| medicine-a | 1.0 |

(b)

| EXPRESSION | PROBABILITY |
|---|---|
| loss(emotion) | 0.8 |
| decrease(e1, emotion) | 0.2 |

| EXPRESSION | PROBABILITY |
|---|---|
| name(e1, medicine-a) | 1.0 |

(b)

| EXPRESSION | PROBABILITY |
|---|---|
| side_effects(e1, loss(emotion)) | 0.8 |
| side_effects(e1, decrease(e1, emotion)) | 0.2 |

Fig. 10

| EXPRESSION | PROBABILITY |
|---|---|
| name(E, medicine-a), side_effects(E, diminish(E, X)) | 0.7 |
| name(E, medicine-a), side_effects(E, decrease(E, X)) | 0.3 |

Fig. 11

(QUERY EXPRESSION)

| EXPRESSION | PROBABILITY |
|---|---|
| name(E, medicine-a), side_effects(E, diminish(E, X)) | 0.7 |
| name(E, medicine-a), side_effects(E, decrease(E, X)) | 0.3 |

×

(NODE TEXT EXPRESSION)

| EXPRESSION | PROBABILITY |
|---|---|
| name(e1, medicine-a) | 1.0 |

×

(NODE TEXT EXPRESSION)

| EXPRESSION | PROBABILITY |
|---|---|
| side_effects(e1, loss(emotion)) | 0.8 |
| side_effects(e1, decrease(e1, emotion)) | 0.2 |

INFORMATION PROCESSING APPARATUS, INFORMATION PROCESSING METHOD, AND COMPUTER READABLE RECORDING MEDIUM

CROSS REFERENCE TO RELATED APPLICATIONS

This application is a National Stage of Application No. PCT/JP2018/007040 filed Feb. 26, 2018, claiming priority based on Japanese Patent Application No. 2017-068453 filed Mar. 30, 2017, the disclosure of which is incorporated herein in its entirety by reference.

TECHNICAL FIELD

The present invention relates to an information processing apparatus and an information processing method that trains, through machine learning, a converter for use when converting natural language into a formal language, as well as a computer readable recording medium having recorded thereon a program for realizing the apparatus and the method.

BACKGROUND ART

In recent years, it has become possible to acquire large-scale knowledge bases through the Internet, and research is underway on systems that answer questions with use of a knowledge base. The knowledge base used in such a system is generally constructed so as to enable the extraction of knowledge that corresponds to a query described in a formal language. Examples of formal languages include Prolog and Resource Description Framework (RDF).

Even when using such a question answering system that employs a knowledge base that can be queried in a formal language, user questions are generally expressed in natural language. For this reason, in order for knowledge that corresponds to a user question to be extracted from the knowledge base, the user question, which is expressed in natural language, needs to be converted into an expression in a formal language.

In view of this, a semantic parser has conventionally been used in order to convert natural language into a formal language. Generally, in a question answering system that employs a knowledge base, a user question expressed in natural language is converted into a formal language expression with use of a semantic parser, and then an answer corresponding to the converted expression is extracted from the knowledge base and presented to the user.

For example, consider the case where the user inputs the natural language question "Who is Alice's father?" to a question answering system employing a knowledge base that can be queried in Prolog. In this case, the question answering system first uses a semantic parser to convert the natural language question into the Prolog query expression "father(X,alice)". The question answering system then extracts knowledge corresponding to the query expression from the knowledge base, and presents the knowledge to the user as an answer to the question.

Note that in order for a suitable answer to the user question to be extracted from the knowledge base, it is necessary to suitably comprehend the semantic structure of the user question and convert the natural language question into an expression in a formal language that is suited to the knowledge base. However, natural language expressions are diverse, and therefore it is difficult to manually construct rules for suitably converting user natural language questions into formal language expressions.

In view of this, a technique has been proposed for using machine learning to automatically construct a semantic parser that is suited to a knowledge base (e.g., see Non-Patent Document 1).

In the technique described in Non-Patent Document 1, a natural language question and a correct answer for that question are prepared in advance, and the prepared natural language question is converted into multiple formal language expressions by a semantic parser. Specifically, the semantic parser performs conversion from natural language into a formal language based on parameters that have been set in advance. Also, in the technique described in Non-Patent Document 1, an answer is extracted from a knowledge base for each of the formal language expressions generated by the semantic parser, and the extracted answers are then compared with the correct answer that was prepared in advance. Then, based on the result of the comparison between the extracted answer and the pre-prepared correct answer, the aforementioned parameters are updated such that the correct answer is obtained for the user question.

LIST OF PRIOR ART DOCUMENTS

Non-Patent Document

Non-Patent Document 1: Percy Liang, Michael Jordan, and Dan Klein. 2011. Learning dependency-based compositional semantics. In Proceedings of the Human Language Technology Conference of the Association for Computational Linguistics, pages 590-599, Portland, Oreg.

Non-Patent Document 2: Panupong Pasupat and Percy Liang. 2015. Compositional semantic parsing on semi-structured tables. In Proceedings of the Annual Meeting of the Association for Computational Linguistics.

DISCLOSURE OF THE INVENTION

Problems to be Solved by the Invention

With the technique in Non-Patent Document 1, if the knowledge base includes semi-structured data, there are cases where the parameters cannot be updated suitably. Semi-structured data refers to data that is structured to a certain extent but also includes unstructured natural language text, such as an HTML table. For example, if a cell in an HTML table includes natural language text, the technique in Non-Patent Document 1 cannot use the text in that cell as knowledge.

The technique described in Non-Patent Document 2 is an example of a technique that utilizes information stored in table cells. In the technique described in Non-Patent Document 2, if text included in a table cell (node) can be parsed as multiple values, a node is created for each of the values, thus creating structured table data. For example, if a cell in the table includes the text "1900", the text is parsed as the numerical value "1900.0" and the date "1900-XX-XX", and structured data is created for each of the parsed results. Therefore, using the technique in Non-Patent Document 2 is thought to make it possible for text included in a table cell to be used as knowledge.

However, when the technique in Non-Patent Document 2 is used to create structured data for a cell that includes text, the text in the cell is merely expressed as an atomic formula. Therefore, if text stored in a cell has semantic structure (if the meaning of the text stored in the cell is expressed by multiple subexpressions) for example, even when the technique in Non-Patent Document 2 is used, the text stored in the cell cannot be suitably used as knowledge.

An example object of the invention is to provide an information processing apparatus, an information processing method, and a computer readable recording medium that can train, through machine learning, a converter for use when converting natural language into a formal language in a question answering system that employs semi-structured data.

Means for Solving the Problems

In order to achieve the aforementioned object, an information processing apparatus that trains, through machine learning, a converter that receives an input of natural language text and outputs a formal language expression based on a parameter, the information processing apparatus comprising:

a formal language query accepting circuit configured to accept a query expression described in a formal language and correct answer data indicating a suitable answer to the query expression;

a semi-structured data accepting circuit configured to accept an input of semi-structured data that includes a text node which includes natural language text that has a semantic structure;

a node text extraction circuit configured to extract the natural language text as node text from the text node of the semi-structured data accepted by the semi-structured data accepting circuit;

a node text expression generation circuit configured to input the node text extracted by the node text extraction circuit to the converter and obtain a node text expression from the converter, the node text expression being a formal language expression;

an answer calculation circuit configured to calculate an answer to the query expression accepted by the formal language query accepting circuit, with use of the node text expression obtained by the node text expression generation circuit; and an update circuit configured to update the parameter of the converter such that the node text expression obtained by the node text expression generation circuit is more likely to be output in the converter, in a case where the answer calculated by the answer calculation circuit matches the correct answer data accepted by the formal language query accepting circuit.

Also, in order to achieve the aforementioned object, an information processing method for training, through machine learning, a converter that receives an input of natural language text and outputs a formal language expression based on a parameter, the information processing method comprising:

accepting a query expression described in a formal language and correct answer data indicating a suitable answer to the query expression;

accepting an input of semi-structured data that includes a text node which includes natural language text that has a semantic structure;

extracting the natural language text as node text from the text node of the semi-structured data;

inputting the node text to the converter and obtaining a node text expression from the converter, the node text expression being a formal language expression;

calculating an answer to the query expression, with use of the node text expression; and updating the parameter of the converter such that the node text expression is more likely to be output in the converter, in a case where the answer calculated to the query expression matches the correct answer data.

Furthermore, in order to achieve the aforementioned object, a non-transitory computer readable recording medium that includes a program recorded thereon, the program causing a computer to train, through machine learning, a converter that receives an input of natural language text and outputs a formal language expression based on a parameter, and the program including instructions that causes a computer to:

accept a query expression described in a formal language and correct answer data indicating a suitable answer to the query expression;

accept an input of semi-structured data that includes a text node which includes natural language text that has a semantic structure;

extract the natural language text as node text from the text node of the semi-structured data;

input the node text to the converter and obtaining a node text expression from the converter, the node text expression being a formal language expression;

calculate an answer to the query expression, with use of the node text expression; and update the parameter of the converter such that the node text expression is more likely to be output in the converter, in a case where the answer calculated to the query expression matches the correct answer data.

Advantageous Effects of the Invention

As described above, according to the invention, it is possible to train, through machine learning, a converter for use when converting natural language into a formal language in a question answering system that employs semi-structured data.

BRIEF DESCRIPTION OF THE DRAWINGS

FIG. 3 is a diagram showing an example of semi-structured data (a table that includes text).

FIG. 4 is a diagram showing a graph structure of the semi-structured data.

FIG. 5 is a diagram showing an example of surface layer terms and deep layer terms.

FIG. 6 is a diagram for illustrating conversion operations in a first converter.

FIG. 7 is a diagram showing an example of relationships between features and weights (parameters) stored in a first parameter holding unit.

FIG. 8 is a diagram showing an example of node text expressions and probabilities.

FIG. 9 is a diagram showing an example of corrected node text expressions.

FIG. 10 is a diagram showing an example of query expressions generated by a second converter.

FIG. 11 is a diagram showing an example of combinations of query expressions and node text expressions.

MODES FOR CARRYING OUT THE INVENTION

Example Embodiments

Hereinafter, an information processing apparatus, an information processing method, and a program according to example embodiments of the present invention will be described with reference to FIGS. 1 to 13.

[Apparatus Configuration]

Figure 1:
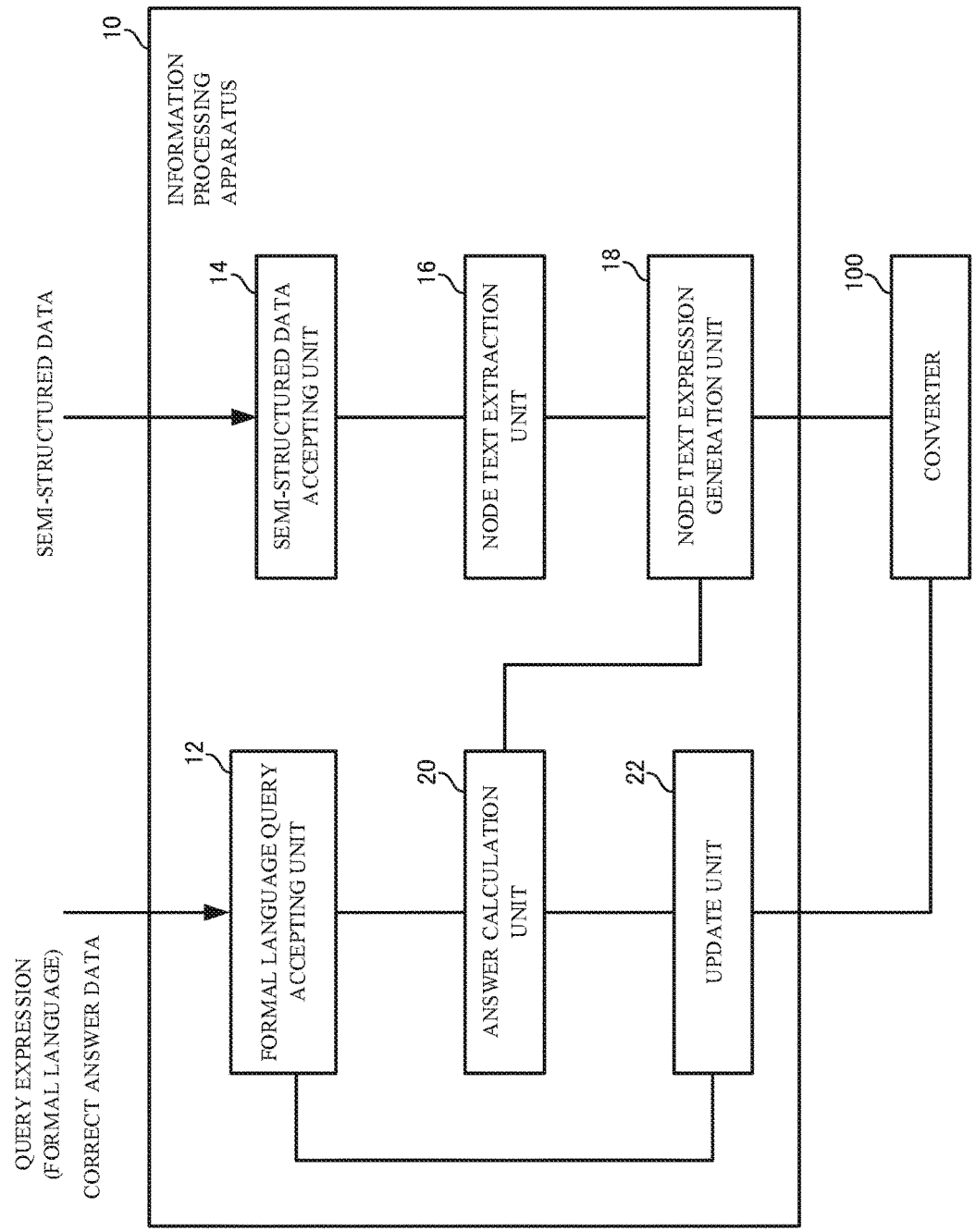
FIG. 1 is a block diagram showing an information processing apparatus in an example embodiment.

FIG. 1 is a block diagram showing an information processing apparatus 10 according to an example embodiment. As shown in FIG. 1, the information processing apparatus 10 of this example embodiment is an apparatus for training a converter 100 through machine learning. The converter 100 receives an input of natural language text and outputs an expression in a formal language based on parameters. In this example embodiment, the converter 100 converts natural language text into a formal language expression with use of a log linear model, for example. The converter 100 is used when converting natural language into a formal language in a question answering system that employs semi-structured data, for example. Note that the technique disclosed in Non-Patent Document 1 for example can be utilized in the converter 100.

The information processing apparatus 10 includes a formal language query accepting unit 12, a semi-structured data accepting unit 14, a node text extraction unit 16, a node text expression generation unit 18, an answer calculation unit 20, and an update unit 22.

The formal language query accepting unit 12 receives an input of a query expression described in a formal language and correct answer data indicating a suitable answer to the query expression. The semi-structured data accepting unit 14 receives an input of semi-structured data that includes text nodes which include natural language text that has a semantic structure.

The node text extraction unit 16 extracts natural language text as node text from a text node in the semi-structured data accepted by the semi-structured data accepting unit 14. The node text expression generation unit 18 inputs the node text extracted by the node text extraction unit 16 to the converter 100, and obtains a node text expression, which is an expression in a formal language, from the converter 100.

The answer calculation unit 20 calculates an answer to the query expression accepted by the formal language query accepting unit 12, with use of the node text expression that the node text expression generation unit 18 obtained from the converter 100. If the answer calculated by the answer calculation unit 20 matches the correct answer data that was accepted by the formal language query accepting unit 12, the update unit 22 updates a parameter of the converter 100 such that the node text expression obtained by the node text expression generation unit 18 is more likely to be output in the converter 100.

As described above, according to this example embodiment, it is possible to train, through machine learning, the converter 100 that is for use when converting natural language into a formal language in a question answering system that employs semi-structured data.

Figure 2:
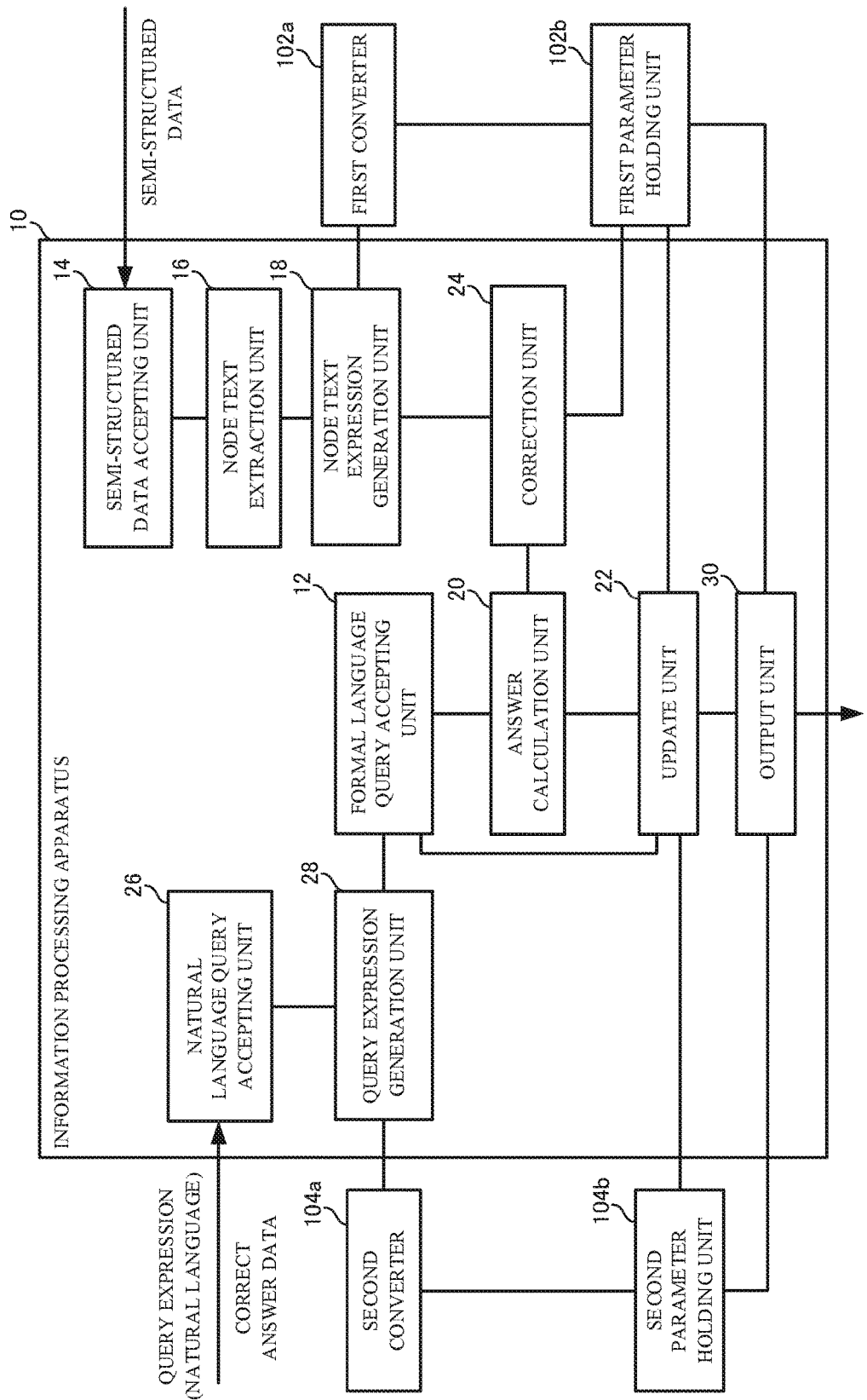
FIG. 2 is a block diagram showing a specific configuration of the information processing apparatus in an example embodiment.

Next, the configuration of the information processing apparatus according to this example embodiment of the present invention will be described in more detail with reference to FIG. 2. FIG. 2 is a block diagram showing the specific configuration of the information processing apparatus according to this example embodiment of the present invention. Note that although the following describes the case where natural language text is converted into the formal language Prolog, another formal language may be used.

As shown in FIG. 2, the information processing apparatus 10 according to this example embodiment includes the formal language query accepting unit 12, the semi-structured data accepting unit 14, the node text extraction unit 16, the node text expression generation unit 18, the answer calculation unit 20, and the update unit 22 that were described above, and additionally includes a correction unit 24, a natural language query accepting unit 26, a query expression generation unit 28, and an output unit 30.

Also, in this example embodiment, the information processing apparatus 10 is connected to a first converter 102a, a first parameter holding unit 102b, a second converter 104a, and a second parameter holding unit 104b. The first converter 102a receives an input of natural language text and outputs a formal language expression based on first parameters held in the first parameter holding unit 102b. The second converter 104a receives an input of natural language text and outputs a formal language expression based on second parameters held in the second parameter holding unit 104b. In this example embodiment, the information processing apparatus 10 can train, through machine learning, the first converter 102a and the second converter 104a by updating the first parameters held in the first parameter holding unit 102b and the second parameters held in the second parameter holding unit 104b.

As described above, the semi-structured data accepting unit 14 receives an input of semi-structured data that includes text nodes which include natural language text that has a semantic structure.

In this example embodiment, the semi-structured data input to the semi-structured data accepting unit 14 can be expressed in a graph structure in which nodes are associated with each other. For example, in the case where the table that includes text in cells shown in FIG. 3 is input to the semi-structured data accepting unit 14 as semi-structured data, that semi-structured data is expressed in the graph structure shown in FIG. 4. Specifically, in this example embodiment, letting each row in the table in FIG. 3 be one entry, a node is created for each row (nodes e1 and e2 in FIG. 4, which are hereinafter called entry nodes), and the pieces of text stored in the cells of each row are defined as text nodes. The text nodes are connected to the corresponding entry node with use of the column names as labels (edges). Accordingly, as shown in (a) and (b) in FIG. 4, the pieces of text data in each row of the table input to the semi-structured data accepting unit 14 can be expressed in a graph structure. In other words, in this example embodiment, a label is associated with each text node.

Note that in the example shown in FIGS. 3 and 4, "Appetite stimulation", "loss of emotion", "Overdose causes dizziness", "prevention of coughs", and "decreased appetite" correspond to pieces of natural language text that have semantic structure. If unstructured data is to be used as knowledge, the meaning of each piece of text (e.g., the "side effect" is "loss of emotion") needs to be expressed by multiple subexpressions.

The following describes the case where the table shown in FIG. 3 is input to the semi-structured data accepting unit 14 as semi-structured data, but the data input to the semi-structured data accepting unit 14 need only be able to be expressed in a graph structure, and is not limited to the above-described table. Also, data in various formats such as XML, HTML, and RDF can be input to the semi-structured data accepting unit 14.

As shown in FIG. 2, the node text extraction unit 16 extracts natural language text as node text from the text nodes in the semi-structured data accepted by the semi-structured data accepting unit 14, as described above. In the example shown in FIGS. 3 and 4, the aforementioned pieces of text having a semantic structure are each extracted as node text, or more specifically, "Medicine-A", "Powder", "Medicine-B", and "Pill" are extracted as node text. In other words, in this example embodiment, text nodes themselves are extracted from the semi-structured data as node text.

As shown in FIG. 2, the node text expression generation unit 18 outputs the node text extracted by the node text extraction unit 16 to the first converter 102*a*. The first converter 102*a* converts the node text received from the node text expression generation unit 18 into node text expressions, which are expressions in a formal language, and outputs the converted node text expressions to the node text expression generation unit 18. Note that a known converter can be used as the first converter 102*a*, and therefore the first converter 102*a* will only be briefly described below. This similarly applies to the second converter 104*a*.

In this example embodiment, the first converter 102*a* uses a log linear model to convert a piece of node text into a node text expression based on multiple pre-set features (characteristics) that each distinguish a pair including one piece of input text and one output formal language expression, for example. Note that the technique disclosed in Non-Patent Document 1 for example can be used in the first converter 102*a* and the second converter 104*a*.

In this example embodiment, as shown in FIG. 5, all combinations of surface layer terms and deep layer terms are set in advance as features, for example. Note that in this example embodiment, "surface layer term" means a term that is included in node text and a later-described query described in natural language (training text). Also, a "deep layer term" is a predicate that corresponds to a surface layer term and a label. In this example embodiment, a predicate having an argument of 0 to 2 is set for each surface layer term, for example. Note that the surface layer terms and the deep layer terms shown in FIG. 5 are simply examples, and the number of surface layer terms and deep layer terms is not limited to the example shown in FIG. 5. In this example embodiment, the features are stored in the first parameter holding unit 102*b*, for example.

In this example embodiment, the first converter 102*a* generates a node text expression by converting the surface layer terms in input node text into deep layer terms. If multiple deep layer terms are set for one surface layer term, the first converter 102*a* can generate multiple node text expressions. This will be described briefly below.

FIG. 6 is a diagram for illustrating conversion operations in the first converter 102*a*. Note that FIG. 6 shows the case where "loss of emotion" was input to the first converter 102*a* as the node text.

As shown in (a) in FIG. 6, when "loss of emotion" is input, the first converter 102*a* references the pre-set features and converts the surface layer term "loss" into the deep layer term "loss/1" and converts the surface layer term "emotion" into the deep layer term "emotion", for example. The atom (predicate not having an argument) "emotion" is then substituted for the argument in the deep layer term "loss/1", thus generating the formal language node text expression "loss (emotion)". Also, as shown in (b) in FIG. 6, the first converter 102*a* converts the surface layer term "loss" into the deep layer term "decrease/2" and converts the surface layer term "emotion" into the deep layer term "emotion", for example. The atom is substituted for the argument in the deep layer term "decrease/2", and e1, which indicates the entry (indicating the table row in this example embodiment), is substituted for a blank argument, thus generating the formal language node text expression "decrease(e1,emotion)". Note that the formal language expressions shown in FIG. 6 are merely examples, and the first converter 102*a* generates multiple formal language expressions based on the pre-set features. Note that in this example embodiment, the conversion of the function word "of" can be omitted as shown in FIG. 6.

Also, in this example embodiment, for each feature, the relationship between the feature and a weight assigned thereto is stored in the first parameter holding unit 102*b*. In this example embodiment, the weights assigned to the features correspond to the first parameter in the first converter 102*a*.

FIG. 7 is a diagram showing an example of the relationships between features and feature weights (parameters) stored in the first parameter holding unit 102*b*. As shown in FIG. 7, in this example embodiment, in the initial setting state, the feature weights are set such that a higher weight is given to a combination (feature) in which the surface layer term and the deep layer term have the same notation as each other.

In this example embodiment, as shown in FIG. 8, for each node text expression that can be output, the first converter 102*a* calculates the probability of obtaining that node text expression based on the feature weights that are set as described above. Note that (a) in FIG. 8 shows an example of a node text expression and a probability that are generated when "Medicine-A" is input to the first converter 102*a* as the node text, and (b) in FIG. 8 shows an example of node text expressions and probabilities that are generated when "loss of emotion" is input to the first converter 102*a* as the node text. The first converter 102*a* outputs the calculated probabilities of obtaining the node text expressions, along with the node text expressions, to the node text expression generation unit 18.

Note that although a detailed description will not be given for this, the first converter 102*a* may generate node text expressions for all of the text nodes, or may select a text node that is associated with a later-described query (training text) or query expression (training text expression), and generate a node text expression for the selected text node. For example, the first converter 102*a* may select a text node that is associated with a label whose notation matches a surface layer term included in the query, and generate a node text expression for the selected text node.

As another example, when converting a surface layer term into a deep layer term, the first converter 102*a* may select a feature whose weight is greater than or equal to a predetermined threshold value, and convert the selected surface layer term into a deep layer term. As yet another example, the first converter 102*a* may select only a predetermined number of node text expressions in order of highest probability, and output the selected node text expressions to the node text expression generation unit 18. As still another example, the first converter 102*a* may randomly select a predetermined number of node text expressions from among the generated node text expressions, and output the selected node text expressions to the node text expression generation unit 18.

As shown in FIG. 2, the correction unit 24 corrects the node text expressions obtained by the node text expression generation unit 18, based on the labels (see FIG. 4) associated with the text nodes from which the node text expressions were extracted. In this example embodiment, the names of columns in the table (FIG. 3) correspond to the labels, as described above. In this example embodiment, based on the relationships between labels (surface layer terms) and deep layer terms stored in the first parameter holding unit 102b (see FIG. 5), the first converter 102a corrects each node text expression by combining the node text expression with the deep layer terms (predicates) that correspond to the labels. Specifically, the correction unit 24 corrects the node text expressions shown in FIG. 8 to the node text expressions shown in FIG. 9, for example. In the example shown in (a) in FIG. 9, the correction unit 24 corrects the node text expression by substituting e1, which indicates the entry, for the first argument of the deep layer term (predicate) corresponding to the label, and substituting the node text expression for the second argument. In this example embodiment, the correction unit 24 outputs the corrected node text expressions and probabilities to the answer calculation unit 20.

Also, in the information processing apparatus 10 according to this example embodiment, the natural language query accepting unit 26 receives an input of a query (training text) described in natural language and correct answer data that indicates a suitable answer to the query. The query expression generation unit 28 inputs the query accepted by the natural language query accepting unit 26 to the second converter 104a. Note that the following describes the case of accepting the query "What is diminished by the side effects of Medicine-A" and accepting "E=e1, X=emotion" as the correct answer data that indicates a suitable answer to the query.

The second converter 104a converts the query (training text) received from the query expression generation unit 28 into a query expression (training text expression) described in a formal language, and outputs the query expression to the query expression generation unit 28. Note that although a detailed description will not be given for this, similarly to the first converter 102a, the second converter 104a uses a log linear model to convert a query (training text) described in natural language into a query expression in a formal language (training text expression) based on multiple pre-set features (characteristics) that each distinguish a pair including one piece of input text and one output formal language expression.

Also, although a detailed description will not be given for this, in this example embodiment, the second parameter holding unit 104b stores features and feature weights (second parameters) similarly to the first parameter holding unit 102b. Similarly to the first converter 102a, the second converter 104a generates one or more query expressions based on the features and weights stored in the second parameter holding unit 104b, and, for each query expression, calculates the probability of obtaining that query expression.

In this example embodiment, the query "What is diminished by the side effects of Medicine-A" is input, and therefore the second converter 104a generates two query expressions as shown in FIG. 10, for example. Note that in the example shown in FIG. 10, the second converter 104a obtains one query expression by converting the surface layer term "diminish" in the query (training text) into the deep layer term "diminish/2", obtains another query expression by converting the surface layer term "diminish" into the deep layer term "decrease/2", and outputs these two query expressions and corresponding probabilities to the query expression generation unit 28.

As shown in FIG. 2, the query expression generation unit 28 outputs the query expressions received from the second converter 104a and the correct answer data (correct answer data corresponding to the query expressions) accepted by the natural language query accepting unit 26 to the formal language query accepting unit 12. The formal language query accepting unit 12 outputs pairs of the query expressions and the correct answer data received from the query expression generation unit 28 to the answer calculation unit 20.

The answer calculation unit 20 calculates answers to the query expressions (see FIG. 10) using the corrected node text expressions (see FIG. 9) received from the correction unit 24. Specifically, the answer calculation unit 20 uses the corrected node text expressions received from the correction unit 24 as the knowledge base, and executes an inquiry based on the query expressions received from the formal language query accepting unit 12.

For example, in the case where the node text expressions shown in FIG. 9 and the query expressions shown in FIG. 10 are input to the answer calculation unit 20, four combinations of a query expression and node text expressions are conceivable as shown in FIG. 11. The answer calculation unit 20 can obtain "E=e1, X=emotion" as an answer from among these four combinations. Note that in the example in FIG. 11, the probability that "E=e1, X=emotion" can be obtained as an answer is calculated by multiplying the probabilities of the query expression and the two node text expressions (0.3×1.0×0.2), thus obtaining 0.06. The answer calculation unit 20 outputs the obtained answer and the probability of obtaining that answer to the update unit 22.

If the answer calculated by the answer calculation unit 20 matches the correct answer data accepted by the formal language query accepting unit 12, the update unit 22 updates the first parameters stored in the first parameter holding unit 102b and the second parameters stored in the second parameter holding unit 104b so as to increase the probability of obtaining the combination of the query expression and the node text expressions for which the correct answer was obtained. As described above, in this example embodiment, "E=e1, X=emotion" is input as the correct answer data, and therefore the answer "E=e1, X=emotion" calculated by the answer calculation unit 20 matches the correct answer data "E=e1, X=emotion" that was accepted by the formal language query accepting unit 12. Accordingly, the answer calculation unit 20 updates the first parameters and the second parameters so as to increase the probability (0.06 in the example in FIG. 11) of obtaining the combination of the query expression and the node text expressions for which "E=e1, X=emotion" was obtained.

In this example embodiment, the update unit 22 updates the first parameters stored in the first parameter holding unit 102b such that the node text expressions obtained by the node text expression generation unit 18 (the node text expressions for which the correct answer was obtained) are more likely to be output in the first converter 102a. Specifically, in this example embodiment, the answer calculation unit 20 updates the first parameters so as to increase the weights associated with the features (characteristics) of the pairs including the node text and the node text expressions for which the correct answer was obtained. For example, in the case where the node text expression shown in (b) in FIG. 6 corresponds to the correct answer, the answer calculation unit 20 updates the first parameters so as to increase the weight given to the two features of the pair including the node text "loss of emotion" and the node text expression "decrease(e1, emotion)" (the combination of the surface layer term "loss" and the deep layer term "decrease/2" and the combination of the surface layer term "emotion" and the deep layer term "emotion").

Also, if the answer calculated by the answer calculation unit 20 matches the correct answer data, the update unit 22 updates the second parameters stored in the second parameter holding unit 104b such that the query expression obtained by the query expression generation unit 28 (the query expression for which the correct answer was obtained) is more likely to be output in the second converter 104a. Note that although this will not be described in detail here, in this example embodiment, similarly to the case of the pairs including the node text and the node text expressions, the update unit 22 updates the second parameters so as to increase the weights associated with the features of the pairs including the query and the query expression for which the correct answer was obtained, for example.

Note that the updating of the first parameters and the second parameters by the update unit 22 can be performed with use of the algorithm described in Non-Patent Document 1 for example.

The output unit 30 outputs the first parameters and the second parameters that were updated by the update unit 22. Accordingly, the updated first parameters and second parameters can be used in another converter as well. In this example embodiment, the output unit 30 outputs the first parameters and the second parameters if the number of times updating was performed by the update unit 22 has reached a designated number that is designated in advance.

As described above, in this example embodiment, a converter generates a query expression (training text expression) from a query (training text) and generates node text expressions from node text in semi-structured data. The node text expressions are corrected by predicates that correspond to labels. The corrected node text expressions are then used as a knowledge base, and an answer to the query expression is calculated. If the obtained answer matches a correct answer that was input in advance, parameters of the converter are updated so as to increase the probability of obtaining the query expression and the node text expressions that lead to that answer.

In this way, in this example embodiment, by applying a converter (semantic parser) to text included in a node in semi-structured data, it is possible to handle the semantic structure of that text. In this example embodiment, the parameters are corrected as described above, and therefore even if nested text in a graph structure has a semantic structure, the converter can convert such text into a suitable formal language expression. Accordingly, in a question answering system, even if text included in the nodes of semi-structured data given as a knowledge base corresponds to an expression having a structure constituted by multiple subexpressions, consideration can be given to that structure in order to suitably answer a question.

Also, in this example embodiment, it is possible to simultaneously perform training for conversion of a query (training text) into a formal language and for conversion of semi-structured data into a formal language. Accordingly, the natural language expression of the training text and the natural language expressions of the semi-structured data, which are necessary for obtaining an answer for the training text, are converted into formal language expressions that use the same predicates. As a result, question answering can be performed more suitably in the question answering system.

Note that if a converter that has been trained in advance is used instead of semi-structured data, it is not necessarily the case that the natural language expression of the training text and the natural language expressions of the semi-structured data, which are necessary for obtaining an answer for the training text, are converted into formal language expressions that use the same predicates. For this reason, there are cases where question answering cannot be performed suitably in the question answering system.

[Apparatus Operations]

Figure 12:
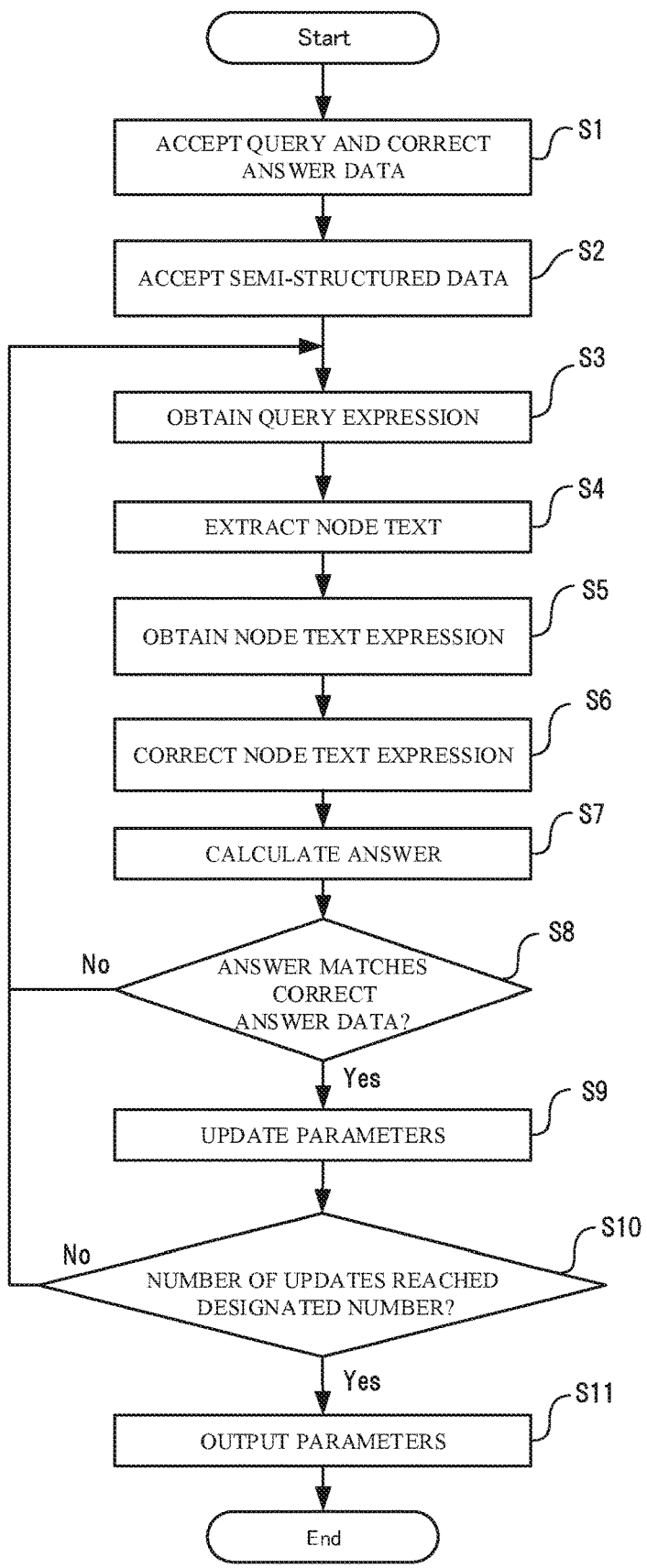
FIG. 12 is a flowchart showing operations of the information processing apparatus in an example embodiment of the present invention.

Next, operations of the information processing apparatus in an example embodiment of the present invention will be described with reference to FIG. 12. FIG. 12 is a flowchart showing operations of the information processing apparatus in this example embodiment of the present invention. The following description also references FIGS. 1 to 11 as appropriate. Also, in this example embodiment, an information processing method is implemented by causing the information processing apparatus 10 to operate. Accordingly, the following description of operations of the information processing apparatus 10 will substitute for a description of an information processing method according to an example embodiment of the present invention.

As shown in FIG. 12, first, in the information processing apparatus 10, the natural language query accepting unit 26 accepts a query described in natural language and correct answer data that indicates a suitable answer to the query (step S1). Also, the semi-structured data accepting unit 14 accepts semi-structured data that includes text nodes which include natural language text that has a semantic structure (step S2).

Next, the query expression generation unit 28 obtains a query expression from the second converter 104a (step S3). In this example embodiment, as described above, the query expression generation unit 28 inputs the query that is described in natural language and was accepted by the natural language query accepting unit 26 to the second converter 104a, and obtains a query expression described in a formal language from the second converter 104a.

Next, the node text extraction unit 16 extracts natural language text as node text from the text nodes in the semi-structured data accepted by the semi-structured data accepting unit 14 (step S4).

Next, the node text expression generation unit 18 obtains node text expressions from the first converter 102a (step S5). In this example embodiment, as described above, the node text expression generation unit 18 inputs the pieces of node text that are described in natural language and were extracted by the node text extraction unit 16 to the first converter 102a, and obtains node text expressions described in a formal language from the first converter 102a.

Next, the correction unit 24 corrects the node text expressions that were obtained by the node text expression generation unit 18 (step S6). In this example embodiment, as described above, the correction unit 24 corrects the node text expressions based on the labels that are associated with the corresponding text nodes.

Next, the answer calculation unit 20 calculates an answer to the query expression that the query expression generation unit 28 obtained from the second converter 104a, with use of the node text expressions that were corrected by the correction unit 24 (step S7). In this example embodiment, as described above, the answer calculation unit 20 uses the corrected node text expressions as a knowledge base, and calculates an answer by executing an inquiry based on query expressions received from the formal language query accepting unit 12.

Next, the update unit 22 determines whether the answer calculated by the answer calculation unit 20 matches the correct answer data accepted by the formal language query accepting unit 12 (step S8). If the answer and the correct answer data match, as described above, the update unit 22 updates the first parameters stored in the first parameter holding unit 102b and the second parameters stored in the second parameter holding unit 104b (step S9). However, if the answer and the correct answer data do not match in step S8, the update unit 22 does not update the parameters. The procedure then returns to the processing performed by the query expression generation unit 28 in step S3.

After the parameters have been updated in step S9, the output unit 30 determines whether or not the number of times that updating was performed by the update unit 22 has reached a designated number that is set in advance (step S10). If the number of times updating was performed has reached the designated number, the output unit 30 outputs the parameters (step S11). If the number of times updating was performed has not reached the designated number, the output unit 30 does not output the parameters. The procedure then returns to the processing performed by the query expression generation unit 28 in step S3.

Note that in this example embodiment, parameter updating (the processing of steps S3 to S10) can be repeatedly executed by the update unit 22 with different combinations of input query (training text) and correct answer data, for example. Specifically, a configuration is possible in which parameter updating is performed the pre-set designated number of times for each query that is input, and then the output unit 30 outputs the parameters after parameter updating has ended for all of the queries. Note that in this case, the processing of step S2 can be omitted when the second and subsequent queries are input.

(Variations)

Note that an example was described in which the first converter 102a and the second converter 104a use different features and parameters as shown in FIG. 2, but the first converter 102a and the second converter 104a may use the same features and parameters. In other words, the first converter 102a and the second converter 104a may use features and parameters that are stored in a common parameter holding unit. In this case, the update unit 22 need only update the parameters that are stored in the common parameter holding unit.

Also, an example was described in which node text expressions and query expressions are respectively generated by two different converters (the first converter 102a and the second converter 104a) as shown in FIG. 2, but the node text expressions and the query expressions may be generated by the same converter. In this case, the one converter may use the same features and parameters when generating the node text expressions and the query expressions, or may use different features and parameters for the node text expressions and the query expressions.

Also, an example was described in which the first parameter holding unit 102b and the second parameter holding unit 104b are provided outside the information processing apparatus 10 as shown in FIG. 2, but the information processing apparatus 10 may include these parameter holding units.

[Program]

A program according to an example embodiment of the present invention may be a program for causing a computer to execute steps S1 to S11 shown in FIG. 12. The information processing apparatus and the information processing method of example embodiments of the present invention can be realized by installing the program in the computer and executing it. In this case, a processor of the computer serving as the information processing apparatus functions as, and performs processing as, the formal language query accepting unit 12, the semi-structured data accepting unit 14, the node text extraction unit 16, the node text expression generation unit 18, the answer calculation unit 20, the update unit 22, the correction unit 24, the natural language query accepting unit 26, the query expression generation unit 28, and the output unit 30.

Also, in this example embodiment, the first parameter holding unit 102b and the second parameter holding unit 104b are realized by storing data files constituting such holding units in a storage apparatus such as a hard disk included in the computer, or by loading a recording medium having such data files stored thereon in a reading apparatus connected to the computer.

Also, the program of this example embodiment may be executed by a computer system constructed by multiple computers. In this case, the computers may each function as any one or more of the formal language query accepting unit 12, the semi-structured data accepting unit 14, the node text extraction unit 16, the node text expression generation unit 18, the answer calculation unit 20, the update unit 22, the correction unit 24, the natural language query accepting unit 26, the query expression generation unit 28, and the output unit 30, for example.

[Physical Configuration]

Figure 13:
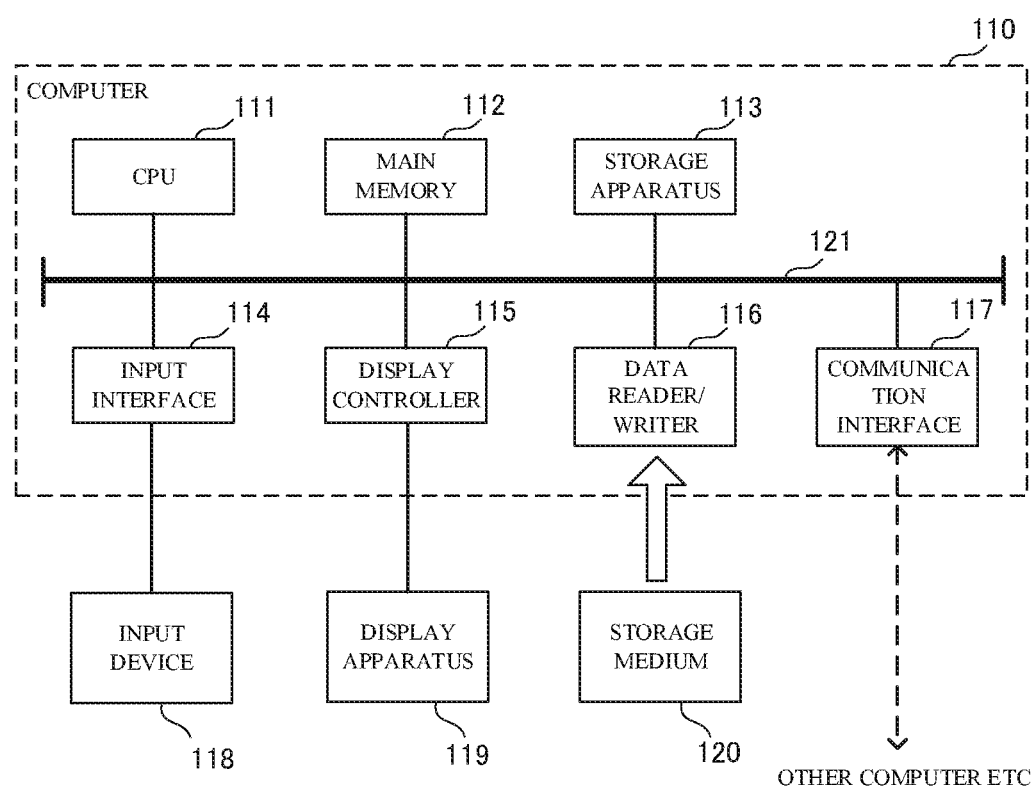
FIG. 13 is a block diagram showing an example of a computer that realizes the information processing apparatus in an example embodiment of the present invention.

A computer that realizes the information processing apparatus by executing the program of this example embodiment will be described below with reference to the drawings. FIG. 13 is a block diagram showing an example of the computer that realizes the information processing apparatus in an example embodiment of the present invention.

As shown in FIG. 13, a computer 110 includes a CPU (Central Processing Unit) 111, a main memory 112, a storage apparatus 113, an input interface 114, a display controller 115, a data reader/writer 116, and a communication interface 117. These members are connected via a bus 121 to enable the exchange of data therebetween. Note that the computer 110 may include a GPU (Graphics Processing Unit) or an FPGA (Field-Programmable Gate Array) in addition to the CPU 111 or instead of the CPU 111.

The CPU 111 carries out various types of arithmetic calculation by loading the program (code) of this example embodiment, which is stored in the storage apparatus 113, to the main memory 112 and executing portions of the program in a predetermined sequence. The main memory 112 is typically a volatile storage apparatus such as a DRAM (Dynamic Random Access Memory). Also, the program of this example embodiment is provided in a state of being stored on a computer readable recording medium 120. Note that the program of this example embodiment may be distributed over the Internet, which can be accessed via the communication interface 117.

Besides a hard disk drive, other examples of the storage apparatus 113 include a semiconductor storage apparatus such as a flash memory. The input interface 114 mediates the transfer of data between the CPU 111 and input devices 118 such as a keyboard and a mouse. The display controller 115 is connected to a display apparatus 119 and controls display performed by the display apparatus 119.

The data reader/writer 116 mediates the transfer of data between the CPU 111 and the recording medium 120, reads out the program from the recording medium 120, and writes processing results obtained by the computer 110 to the recording medium 120. The communication interface 117 mediates the transfer of data between the CPU 111 and other computers.

Examples of the recording medium 120 include a general-purpose semiconductor storage device such as a CF (Compact Flash (registered trademark)) or an SD (Secure Digital) card, a magnetic storage medium such as a flexible disk, and an optical storage medium such as a CD-ROM (Compact Disk Read Only Memory).

Note that the information processing apparatus according to an example embodiment of the present invention can also be realized with use of hardware that corresponds to the above-described units, instead of a computer having the program installed therein. Furthermore, a configuration is possible in which one portion of the information processing apparatus is realized by a program, and the remaining portion is realized by hardware.

The example embodiments described above can be partially or entirely realized by Supplementary Notes 1 to 27 listed below, but the present invention is not limited to the following descriptions.

(Supplementary Note 1)

An information processing apparatus that trains, through machine learning, a converter that receives an input of natural language text and outputs a formal language expression based on a parameter, the information processing apparatus comprising:

a formal language query accepting unit configured to accept a query expression described in a formal language and correct answer data indicating a suitable answer to the query expression;

a semi-structured data accepting unit configured to accept an input of semi-structured data that includes a text node which includes natural language text that has a semantic structure;

a node text extraction unit configured to extract the natural language text as node text from the text node of the semi-structured data accepted by the semi-structured data accepting unit;

a node text expression generation unit configured to input the node text extracted by the node text extraction unit to the converter and obtain a node text expression from the converter, the node text expression being a formal language expression;

an answer calculation unit configured to calculate an answer to the query expression accepted by the formal language query accepting unit, with use of the node text expression obtained by the node text expression generation unit; and an update unit configured to update the parameter of the converter such that the node text expression obtained by the node text expression generation unit is more likely to be output in the converter, in a case where the answer calculated by the answer calculation unit matches the correct answer data accepted by the formal language query accepting unit.

(Supplementary Note 2)

The information processing apparatus according to Supplementary Note 1, wherein the semi-structured data can be expressed in a graph structure in which a plurality of nodes including the text node are associated with each other.

(Supplementary Note 3)

The information processing apparatus according to Supplementary Note 1 or 2, further including:

a correction unit configured to correct the node text expression, wherein a label is associated with the text node, the correction unit corrects the node text expression by combining the node text expression with a predicate that corresponds to the label associated with the text node, and the answer calculation unit calculates the answer to the query expression with use of the node text expression corrected by the correction unit.

(Supplementary Note 4)

The information processing apparatus according to any of Supplementary Notes 1 to 3, further including:

a natural language query accepting unit configured to accept a query described in natural language and the correct answer data that indicates a suitable answer to the query; and a query expression generation unit configured to input the query accepted by the natural language query accepting unit to the converter and obtain a query expression described in the formal language from the converter, wherein the update unit updates the parameter of the converter such that the query expression obtained by the query expression generation unit is more likely to be output in the converter, in a case where the answer calculated by the answer calculation unit matches the correct answer data.

(Supplementary Note 5)

The information processing apparatus according to Supplementary Note 4, wherein the converter includes a first converter that outputs the node text expression and a second converter that outputs the query expression.

(Supplementary Note 6)

The information processing apparatus according to Supplementary Note 5, wherein the first converter and the second converter include the same parameter.

(Supplementary Note 7)

The information processing apparatus according to Supplementary Note 5, wherein the parameter includes a first parameter used by the first converter and a second parameter used by the second converter.

(Supplementary Note 8)

The information processing apparatus according to any of Supplementary Notes 1 to 7, wherein the parameter of the converter is a weight associated with a feature of a pair including natural language text input to the converter and a formal language expression output by the converter, and the update unit updates the parameter so as to increase a weight associated with a feature of a pair that includes the node text and the node text expression, in a case where the answer calculated by the answer calculation unit matches the correct answer data.

(Supplementary Note 9)

The information processing apparatus according to any of Supplementary Notes 1 to 8, further including:

an output unit configured to output the parameter of the converter that was updated by the update unit.

(Supplementary Note 10)

An information processing method for training, through machine learning, a converter that receives an input of natural language text and outputs a formal language expression based on a parameter, the information processing method including:

(a) a step of accepting a query expression described in a formal language and correct answer data indicating a suitable answer to the query expression;

(b) a step of accepting an input of semi-structured data that includes a text node which includes natural language text that has a semantic structure;

(c) a step of extracting the natural language text as node text from the text node of the semi-structured data accepted in the (b) step;

(d) a step of inputting the node text extracted in the (c) step to the converter and obtaining a node text expression from the converter, the node text expression being a formal language expression;

(e) a step of calculating an answer to the query expression accepted in the (a) step, with use of the node text expression obtained in the (d) step; and (f) a step of updating the parameter of the converter such that the node text expression obtained in the (d) step is more likely to be output in the converter, in a case where the answer calculated in the (e) step matches the correct answer data accepted in the (a) step.

(Supplementary Note 11)

The information processing method according to Supplementary Note 10, wherein the semi-structured data can be expressed in a graph structure in which a plurality of nodes including the text node are associated with each other.

(Supplementary Note 12)

The information processing method according to Supplementary Note 10 or 11, further including:

(g) a step of correcting the node text expression, wherein a label is associated with the text node, in the (g) step, the node text expression is corrected by combining the node text expression with a predicate that corresponds to the label associated with the text node, and in the (e) step, the answer to the query expression is calculated with use of the node text expression corrected in the (g) step.

(Supplementary Note 13)

The information processing method according to any of Supplementary Notes 10 to 12, further including:

(h) a step of accepting a query described in natural language; and (i) a step of inputting the query accepted in the (h) step to the converter and obtaining a query expression described in the formal language from the converter, wherein in the (a) step, the query expression obtained from the converter in the (i) step is accepted, and in the (f) step, the parameter of the converter is updated such that the query expression obtained in the (i) step is more likely to be output in the converter, in a case where the answer calculated in the (e) step matches the correct answer data.

(Supplementary Note 14)

The information processing method according to Supplementary Note 13, wherein the converter includes a first converter that outputs the node text expression and a second converter that outputs the query expression.

(Supplementary Note 15)

The information processing method according to Supplementary Note 14, wherein the first converter and the second converter include the same parameter.

(Supplementary Note 16)

The information processing method according to Supplementary Note 14, wherein the parameter includes a first parameter used by the first converter and a second parameter used by the second converter.

(Supplementary Note 17)

The information processing method according to any of Supplementary Notes 10 to 16, wherein the parameter of the converter is a weight associated with a feature of a pair including natural language text input to the converter and a formal language expression output by the converter, and in the (f) step, the parameter is updated so as to increase a weight associated with a feature of a pair that includes the node text and the node text expression, in a case where the answer calculated in the (e) step matches the correct answer data.

(Supplementary Note 18)

The information processing method according to any of Supplementary Notes 10 to 17, further including:

(j) a step of outputting the parameter of the converter that was updated in the (f) step.

(Supplementary Note 19)

A non-transitory computer readable recording medium that includes a program recorded thereon, the program causing a computer to train, through machine learning, a converter that receives an input of natural language text and outputs a formal language expression based on a parameter, and the program including instructions that causes a computer to carry out:

(a) a step of accepting a query expression described in a formal language and correct answer data indicating a suitable answer to the query expression;

(b) a step of accepting an input of semi-structured data that includes a text node which includes natural language text that has a semantic structure;

(c) a step of extracting the natural language text as node text from the text node of the semi-structured data accepted in the (b) step;

(d) a step of inputting the node text extracted in the (c) step to the converter and obtaining a node text expression from the converter, the node text expression being a formal language expression;

(e) a step of calculating an answer to the query expression accepted in the (a) step, with use of the node text expression obtained in the (d) step; and (f) a step of updating the parameter of the converter such that the node text expression obtained in the (d) step is more likely to be output in the converter, in a case where the answer calculated in the (e) step matches the correct answer data accepted in the (a) step.

(Supplementary Note 20)

The non-transitory computer readable recording medium according to Supplementary Note 19, wherein the semi-structured data can be expressed in a graph structure in which a plurality of nodes including the text node are associated with each other.

(Supplementary Note 21)

The non-transitory computer readable recording medium according to Supplementary Note 19 or 20, wherein the program further includes instructions that cause the computer to carry out:

(g) a step of correcting the node text expression, wherein a label is associated with the text node, in the (g) step, the node text expression is corrected by combining the node text expression with a predicate that corresponds to the label associated with the text node, and in the (e) step, the answer to the query expression is calculated with use of the node text expression corrected in the (g) step.

(Supplementary Note 22)

The non-transitory computer readable recording medium according to any of Supplementary Notes 19 to 21, wherein the program further includes instructions that cause the computer to carry out:

(h) a step of accepting a query described in natural language; and (i) a step of inputting the query accepted in the (h) step to the converter and obtaining a query expression described in the formal language from the converter, wherein in the (a) step, the query expression obtained from the converter in the (i) step is accepted, and in the (f) step, the parameter of the converter is updated such that the query expression obtained in the (i) step is more likely to be output in the converter, in a case where the answer calculated in the (e) step matches the correct answer data.

(Supplementary Note 23)

The non-transitory computer readable recording medium according to Supplementary Note 22, wherein the converter includes a first converter that outputs the node text expression and a second converter that outputs the query expression.

(Supplementary Note 24)

The non-transitory computer readable recording medium according to Supplementary Note 23, wherein the first converter and the second converter include the same parameter.

(Supplementary Note 25)

The non-transitory computer readable recording medium according to Supplementary Note 23, wherein the parameter includes a first parameter used by the first converter and a second parameter used by the second converter.

(Supplementary Note 26)

The non-transitory computer readable recording medium according to any of Supplementary Notes 19 to 25, wherein the parameter of the converter is a weight associated with a feature of a pair including natural language text input to the converter and a formal language expression output by the converter, and in the (f) step, the parameter is updated so as to increase a weight associated with a feature of a pair that includes the node text and the node text expression, in a case where the answer calculated in the (e) step matches the correct answer data.

(Supplementary Note 27)

The non-transitory computer readable recording medium according to any of Supplementary Notes 19 to 26, wherein the program further includes instructions that cause the computer to carry out:

(j) a step of outputting the parameter of the converter that was updated in the (f) step.

Although the invention has been described by way of example embodiments above, the invention is not limited to the above example embodiments. Configurations and details of the invention can be changed in various ways that would be understandable to a person skilled in the art within the scope of the invention.

This application is based upon and claims the benefit of priority from Japanese application No. 2017-068453, filed on Mar. 30, 2017, the disclosure of which is incorporated herein in its entirety by reference.

LIST OF REFERENCE SIGNS

10 Information processing apparatus
12 Formal language query accepting unit
14 Semi-structured data accepting unit
16 Node text extraction unit
18 Node text expression generation unit
20 Answer calculation unit
22 Update unit
24 Correction unit
26 Natural language query accepting unit
28 Query expression generation unit
30 Output unit
100 Converter
102*a* First converter
102*b* First parameter holding unit
104*a* Second converter
104*b* Second parameter holding unit

The invention claimed is:

1. An information processing apparatus that trains, through machine learning, a converter that receives an input of natural language text and outputs a formal language expression based on a parameter, the information processing apparatus comprising:
a formal language query accepting circuit configured to accept:
a query expression described in a formal language, and correct answer data indicating a suitable answer to the query expression;
a semi-structured data accepting circuit configured to accept an input of semi-structured data, the semi-structured data including:
a text node including natural language text that has a semantic structure, and
a label associated with the text node;
a node text extraction circuit configured to extract the natural language text as node text from the text node of the semi-structured data accepted by the semi-structured data accepting circuit;
a node text expression generation circuit configured to input the node text extracted by the node text extraction circuit to the converter and obtain a node text expression from the converter, the node text expression being a formal language expression;
a correction circuit configured to correct the node text expression by combining the node text expression with a predicate corresponding to the label associated with the text node;
an answer calculation circuit configured to calculate an answer to the query expression accepted by the formal language query accepting circuit, the calculation based on the node text expression obtained by the node text expression generation circuit and corrected by the correction circuit; and
an update circuit configured to update the parameter of the converter such that the node text expression obtained by the node text expression generation circuit is more likely to be output in the converter, in a case where the answer calculated by the answer calculation circuit matches the correct answer data accepted by the formal language query accepting circuit.

2. The information processing apparatus according to claim 1,
wherein the semi-structured data can be expressed in a graph structure in which a plurality of nodes including the text node are associated with each other.

3. The information processing apparatus according to claim 1, further comprising:
a natural language query accepting circuit configured to accept a query described in natural language and the correct answer data that indicates a suitable answer to the query; and
a query expression generation circuit configured to input the query accepted by the natural language query accepting circuit to the converter and obtain a query expression described in the formal language from the converter, wherein the update circuit updates the parameter of the converter such that the query expression obtained by the query expression generation circuit is more likely to be output in the converter, in a case where the answer calculated by the answer calculation circuit matches the correct answer data.

4. The information processing apparatus according to claim 3, wherein the converter includes a first converter that outputs the node text expression and a second converter that outputs the query expression.

5. The information processing apparatus according to claim 4, wherein the first converter and the second converter include the same parameter.

6. The information processing apparatus according to claim 4, wherein the parameter includes a first parameter used by the first converter and a second parameter used by the second converter.

7. The information processing apparatus according to claim 1, wherein the parameter of the converter is a weight associated with a feature of a pair including natural language text input to the converter and a formal language expression output by the converter, and the update circuit updates the parameter so as to increase a weight associated with a feature of a pair that includes the node text and the node text expression, in a case where the answer calculated by the answer calculation circuit matches the correct answer data.

8. The information processing apparatus according to claim 1, further comprising:

an output circuit configured to output the parameter of the converter that was updated by the update circuit.

9. An information processing method for training, through machine learning, a converter that receives an input of natural language text and outputs a formal language expression based on a parameter, the information processing method comprising:

accepting a query expression described in a formal language;

accepting correct answer data indicating a suitable answer to the query expression;

accepting an input of semi-structured data, the semi-structured data including:
　a text node including natural language text that has a semantic structure, and
　a label associated with the text node;

extracting the natural language text as node text from the text node of the semi-structured data;

inputting the node text to the converter and obtaining a node text expression from the converter, the node text expression being a formal language expression;

correcting the node text expression by combining the node text expression with a predicate corresponding to the label associated with the text node;

calculating an answer to the query expression based on the corrected node text expression; and updating the parameter of the converter such that the node text expression is more likely to be output in the converter, in a case where the answer calculated to the query expression matches the correct answer data.

10. The information processing method according to claim 9, wherein the semi-structured data can be expressed in a graph structure in which a plurality of nodes including the text node are associated with each other.

11. The information processing method according to claim 9, further comprising:

accepting a query described in natural language; and inputting the query to the converter and obtaining a query expression described in the formal language from the converter, wherein when the query expression is accepted, the query expression obtained from the converter is accepted, and when the parameter of the converter is updated, the parameter of the converter is updated such that the query expression obtained from the converter is more likely to be output in the converter, in a case where the answer calculated to the query expression matches the correct answer data.

12. The information processing method according to claim 11, wherein the converter includes a first converter that outputs the node text expression and a second converter that outputs the query expression.

13. The information processing method according to claim 12, wherein the first converter and the second converter include the same parameter.

14. The information processing method according to claim 12, wherein the parameter includes a first parameter used by the first converter and a second parameter used by the second converter.

15. The information processing method according to claim 9, wherein the parameter of the converter is a weight associated with a feature of a pair including natural language text input to the converter and a formal language expression output by the converter, and when the parameter of the converter is updated, the parameter is updated so as to increase a weight associated with a feature of a pair that includes the node text and the node text expression, in a case where the answer calculated to the query expression matches the correct answer data.

16. The information processing method according to claim 9, further comprising:

outputting the parameter of the converter after the parameter of the converter is updated.

17. A non-transitory computer readable recording medium that includes a program recorded thereon, the program causing a computer to train, through machine learning, a converter that receives an input of natural language text and outputs a formal language expression based on a parameter, and the program including instructions that causes a computer to:

accept a query expression described in a formal language;

accept correct answer data indicating a suitable answer to the query expression;

accept an input of semi-structured data, the semi-structured data including: a text node which includes natural language text that has a semantic structure, and a label associated with the text node;

extract the natural language text as node text from the text node of the semi-structured data;

input the node text to the converter and obtaining a node text expression from the converter, the node text expression being a formal language expression;
correct the node text expression by combining the node text expression with a predicate corresponding to the label associated with the text node;
calculate an answer to the query expression based on the corrected node text expression; and
update the parameter of the converter such that the node text expression is more likely to be output in the converter, in a case where the answer calculated to the query expression matches the correct answer data.

\* \* \* \* \*